United States Patent
Park (10) Patent No.: US 8,116,435 B2
(45) Date of Patent: Feb. 14, 2012

(54) EMERGENCY CALL PROCESSING APPARATUS AND METHOD IN PRIVATE SWITCHING SYSTEM

(75) Inventor: Seok-Hong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1377 days.

(21) Appl. No.: 11/635,022

(22) Filed: Dec. 7, 2006

(65) Prior Publication Data

US 2007/0189468 A1 Aug. 16, 2007

(30) Foreign Application Priority Data

Jan. 20, 2006 (KR) .................. 10-2006-0006489

(51) Int. Cl.
*H04M 11/04* (2006.01)
(52) U.S. Cl. ................. 379/37; 379/142.02; 379/142.04
(58) Field of Classification Search .................... 379/37, 379/45, 142.02, 161, 33, 142.04
See application file for complete search history.

(56) References Cited

U.S. PATENT DOCUMENTS

2002/0172336 A1* 11/2002 Postma et al. ........... 379/110.01
2004/0203576 A1* 10/2004 Droste et al. ............... 455/404.1

FOREIGN PATENT DOCUMENTS

| JP | 08-116360 | 5/1996 |
| JP | 08-163278 | 6/1996 |
| JP | 10-190838 | 7/1998 |
| JP | 11-285040 | 10/1999 |
| JP | 11285040 | * 10/1999 |
| KR | 2004-0022573 | 3/2004 |

OTHER PUBLICATIONS

Korean Office Action corresponding to Korean Patent Application No. 2006-0006489, issued on Apr. 27, 2007.
Korean Decision of Grant corresponding to Korean Patent Application No. 2006-0006489, issued on Oct. 30, 2007.

* cited by examiner

*Primary Examiner* — Curtis Kuntz
*Assistant Examiner* — Yosef K Laekemariam
(74) *Attorney, Agent, or Firm* — H.C. Park & Associates, PLC (57) ABSTRACT

An emergency call processing apparatus and method in a private switching system according to certain embodiments is available for some emergency telephone numbers, such as 119 and 911, set for emergency. A private branch exchange has more extension subscribers than office lines, and thus the extension subscribers share the office lines. If an emergency outgoing call is attempted when all of the office lines are busy, priority is given to the emergency outgoing call, and one of the busy lines is forcibly intercepted so that the emergency outgoing call can be processed. In particular, when an extension terminal is set in a locking mode, an emergency call can be processed without inconveniently disabling the locking mode through the input of a password, and thus the emergency can be easily coped with. Then, the emergency outgoing call can be easily processed, even if all of the lines are busy or the subscriber terminal is set in the locking mode.

30 Claims, 3 Drawing Sheets

FIG.2A

EMERGENCY CALL PROCESSING APPARATUS AND METHOD IN PRIVATE SWITCHING SYSTEM

CLAIM OF PRIORITY

This application makes reference to, incorporates the same herein, and claims all benefits accruing under 35 U.S.C.§119 from an application for APPARATUS AND METHOD FOR PROCESSING EMERGENCY CALL IN PRIVATE SWITCHING SYSTEM earlier filed in the Korean Intellectual Property Office on the 20$^{th}$ of Jan. 2006 and there duly assigned Ser. No. 10-2006-0006489.

BACKGROUND OF THE INVENTION

1. Technical Field

The present invention relates to an emergency call processing apparatus and method in a private switching system and, more particularly, an apparatus and method by means of which an extension subscriber of a private branch exchange can make an emergency call even if all lines are busy, as well as originate an emergency call with an extension terminal even if it is locked.

2. Description of the Related Art

In general, subscribers of a private switching system are graded in call origination, and thus sometimes they are screened from calling to specific telephone numbers. Then, dialing even to an emergency telephone number may be screened also, and thus sometimes an emergency call cannot be processed.

For example, if the calling function of an extension terminal is set in a locking mode, when a user dials a general telephone number or an emergency telephone number, an outgoing call is not transmitted to the corresponding number. Then, the user has to input a preset password, and only if the inputted password is validated, the calling function can be moved from the locking mode so as to transmit an outgoing call intended by the user.

Furthermore, if all lines connected to the private branch exchange are busy, the user of the extension terminal cannot have a call until a line becomes available.

In a private switching system adopting such technology, if an available line does not exist or a terminal is set in a locking mode, an extension subscriber cannot make a call, even in the case of an emergency.

SUMMARY OF THE INVENTION

It is, therefore, an object of the present invention to provide an emergency call processing apparatus and method in a private switching system, by means of which an extension subscriber of a private branch exchange can make an emergency call even if all lines are busy, as well as originate an emergency call with an extension terminal even if it is locked.

That is, according to an object of the invention, when an emergency telephone number is inputted from an extension subscriber terminal, even if all lines are busy, at least one busy line is intercepted so that an emergency outgoing call can be transmitted via the intercepted line. When the extension terminal is in a locking mode, if an inputted telephone number is equivalent to or matches an emergency telephone number, the locking mode is disabled so that a corresponding emergency outgoing call can be processed.

According to an aspect of the invention, an emergency call processing method in a private switching system comprises the steps of: upon receiving a telephone number for call origination from a user in a locking mode, determining whether the inputted telephone number is equivalent to or matches at least one preset emergency telephone number; and, if the inputted telephone number is equivalent to or matches at least one preset emergency telephone number, disabling the locking mode and transmitting an outgoing call corresponding to the inputted telephone number to a private exchange branch.

The determining step preferably comprises: if the telephone number inputted by the user is not equivalent to or does not match any one of the emergency telephone numbers, displaying digit values of the inputted telephone number by masking; comparing the digit values of the inputted telephone number sequentially to digit values of a password for disabling the locking mode; and, if the inputted telephone number matches the password, disabling the locking mode and transmitting the digit values of the inputted telephone number to the private branch exchange.

The displaying step preferably comprises: if the inputted telephone number is equivalent to or matches at least one of the emergency telephone numbers, displaying the digit values of the inputted telephone number without masking.

According to another aspect of the invention, an emergency call processing method in a private switching system comprises the steps of: when digit values of a telephone number for call origination received from a private subscriber terminal match digit values of at least one preset emergency telephone number, determining whether an available line exists at present; and, if an available line does not exist at present, intercepting at least one occupied line according to a preset priority, allocating the intercepted line for emergency call origination, and transmitting an emergency outgoing call via the allocated line.

The preset priority in the step of intercepting at least one occupied line preferably comprises at least one of priority according to line-occupied time and priority according to line number set for emergency call origination.

According to still another aspect of the invention, an emergency call processing method in a private switching system comprises the steps of: at a subscriber terminal, upon receiving a telephone number for call origination from a user in a locking mode, determining whether the inputted telephone number is equivalent to or matches at least one of preset emergency telephone number; if the inputted telephone number is equivalent to or matches at least one of the preset emergency telephone numbers, at the subscriber terminal, disabling the locking mode and transmitting digit values of the inputted telephone number to a private exchange branch; at the private exchange branch, upon receiving the digit values from the subscriber terminal, determining whether a line available for emergency call origination corresponding to the received digit values exists; and, if the available line does not exist at present, at the private exchange branch, intercepting at least one occupied line according to preset priority, allocating the intercepted line for emergency call origination, and transmitting an emergency outgoing call via the allocated line.

The comparing step preferably comprises: when the telephone number inputted by the user is not equivalent to or does not match any one of the emergency telephone numbers, displaying digit values of the inputted telephone number by masking; comparing the digit values of the inputted telephone number sequentially with digit values of a password for disabling the locking mode; and, if the inputted telephone number matches the password, disabling the locking mode and transmitting the digit values of the inputted telephone number to the private branch exchange.

The emergency call processing method preferably further comprises synchronizing and registering the emergency telephone numbers between the subscriber terminal and the private branch exchange when initially or additionally registering or deleting each of the emergency telephone numbers.

The step of synchronizing and registering the emergency telephone numbers preferably comprises: at the subscriber terminal, upon receiving a request for emergency telephone number registration or deletion from the user via a user interface (UI) of the subscriber terminal, updating its own database according to information on a requested emergency telephone number, and transmitting emergency telephone number update information to the private branch exchange; and, at the private branch exchange, updating its own emergency telephone number database according to the emergency telephone number update information transmitted from the subscriber terminal, and transmitting the updated information to a second terminal so as to synchronize with the second terminal.

The step of synchronizing and registering the emergency telephone numbers preferably comprises: at the private branch exchange, upon receiving a request for emergency telephone number registration or deletion from the user, updating its own database according to information on the requested emergency telephone number, and transmitting emergency telephone number update information to the subscriber terminal so as to synchronize with the subscriber terminal.

According to yet another aspect of the invention, an emergency call processing method in a private switching system comprises the steps of: at a subscriber terminal, upon receiving a telephone number for call origination from a user, determining whether a locking mode is set; at the subscriber terminal, if the locking mode is not set, transmitting digit values of the inputted telephone number to a private branch exchange; at the private branch exchange, upon receiving the digit values from the subscriber terminal, comparing the received digit values with digit values corresponding to emergency telephone numbers previously stored; at the private branch exchange, if the received digit values match the digit values corresponding to at least one of the emergency telephone numbers previously stored, determining whether a line available for emergency call origination exists; and, at the private branch exchange, if the available line does not exist at present, intercepting at least one occupied line according to a preset priority, allocating the intercepted line for emergency call origination, and transmitting an emergency outgoing call via the allocated emergency call line.

According to another aspect of the invention, an emergency call processing apparatus in a private switching system comprises a call processing unit which, if a telephone number for call origination inputted by a user in a locking mode is equivalent to or matches at least one preset emergency telephone number, disables the locking mode and transmits an outgoing call corresponding to the inputted telephone number to a private branch exchange.

The call-processing unit preferably comprises: a memory for storing, in a digital format, the emergency telephone numbers and a password for disabling the locking mode; a display unit for displaying digit values of the inputted telephone number by masking; and a controller which, if the inputted telephone number from the user is not equivalent to or does not match any one of the emergency telephone numbers, masks the digit values of the inputted telephone number, controls the display unit to display the digit values of the inputted telephone number, and compares the digit values of the inputted telephone number sequentially with digit values of the password for disabling the locking mode, and which, if the inputted telephone number is equivalent to or matches the password, disables the locking mode and transmits the digit values of the inputted telephone number to the private branch exchange.

Preferably, if the telephone number inputted in the locking mode is equivalent to or matches at least one of the emergency telephone numbers, the controller controls the display unit to display the digit values of the inputted telephone number without masking.

According to another aspect of the invention, an emergency call processing apparatus in a private switching system comprises a call processing module which, if digit values of a telephone number for call origination received from a private subscriber terminal are equivalent to or match digit values of at least one preset emergency telephone number, determines whether an available line exists at present, and if the available line does not exist at present, intercepts at least one occupied line according to a preset priority, allocates the intercepted line for emergency call origination, and transmits an emergency outgoing call via the allocated line.

The call processing module preferably comprises a memory for storing information on the emergency telephone numbers and the preset priority for intercepting at least one of the occupied lines.

The priority information for intercepting at least one of the occupied lines preferably comprises at least one of priority information according to line-occupied time and priority information according to line number set for emergency call origination.

According to a further aspect of the invention, a private switching system comprises: a subscriber terminal which, if a telephone number for call origination inputted by a user in a locking mode is equivalent to or matches at least one preset telephone number, disables the locking mode and transmits digit values of the inputted telephone number; and a private branch exchange which, upon receiving the digit values for call origination from the subscriber terminal, determines whether an available line exists at present, and if the available line does not exist at present, intercepts at least one occupied line according to a preset priority, allocates the intercepted line for emergency call origination, and transmits an emergency outgoing call via the allocated line.

The subscriber terminal preferably comprises: a memory for storing, in a digital format, the emergency telephone numbers and password for disabling the locking mode; a display unit for displaying digit values corresponding to the inputted telephone number by masking; a controller which, if the inputted telephone number from the user is not equivalent to or does not match any one of the emergency telephone numbers, masks the digit values of the inputted telephone number and controls the display unit to display the digit values of the inputted telephone number, and which, if the inputted telephone number is equivalent to or matches the password, disables the locking mode and transmits the digit values of the inputted telephone number sequentially to the private branch exchange.

According to yet another aspect of the invention, a private switching system comprises: a subscriber terminal which, upon receiving a telephone number for call origination inputted by a user when a locking mode is not set, transmits digit values of the inputted telephone number; and a private branch exchange which, upon receiving the digit values from the subscriber terminal, if the received digit values are equivalent to or match digit values corresponding to at least one of the emergency telephone numbers previously stored, determines whether a line available for emergency call origination exists, and if the available line does not exist at present, intercepts at least one of occupied lines according to a preset priority, allocates the intercepted line for emergency call origination, and transmits an emergency outgoing call via the allocated emergency call line.

The priority information for intercepting at least one of the occupied lines preferably comprises at least one of priority information according to line-occupied time and priority information according to line number set for emergency call origination.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully hereinafter with reference to the accompanying drawings, in which preferred embodiments of a packet processing apparatus and method of the invention are shown.

Figure 1:
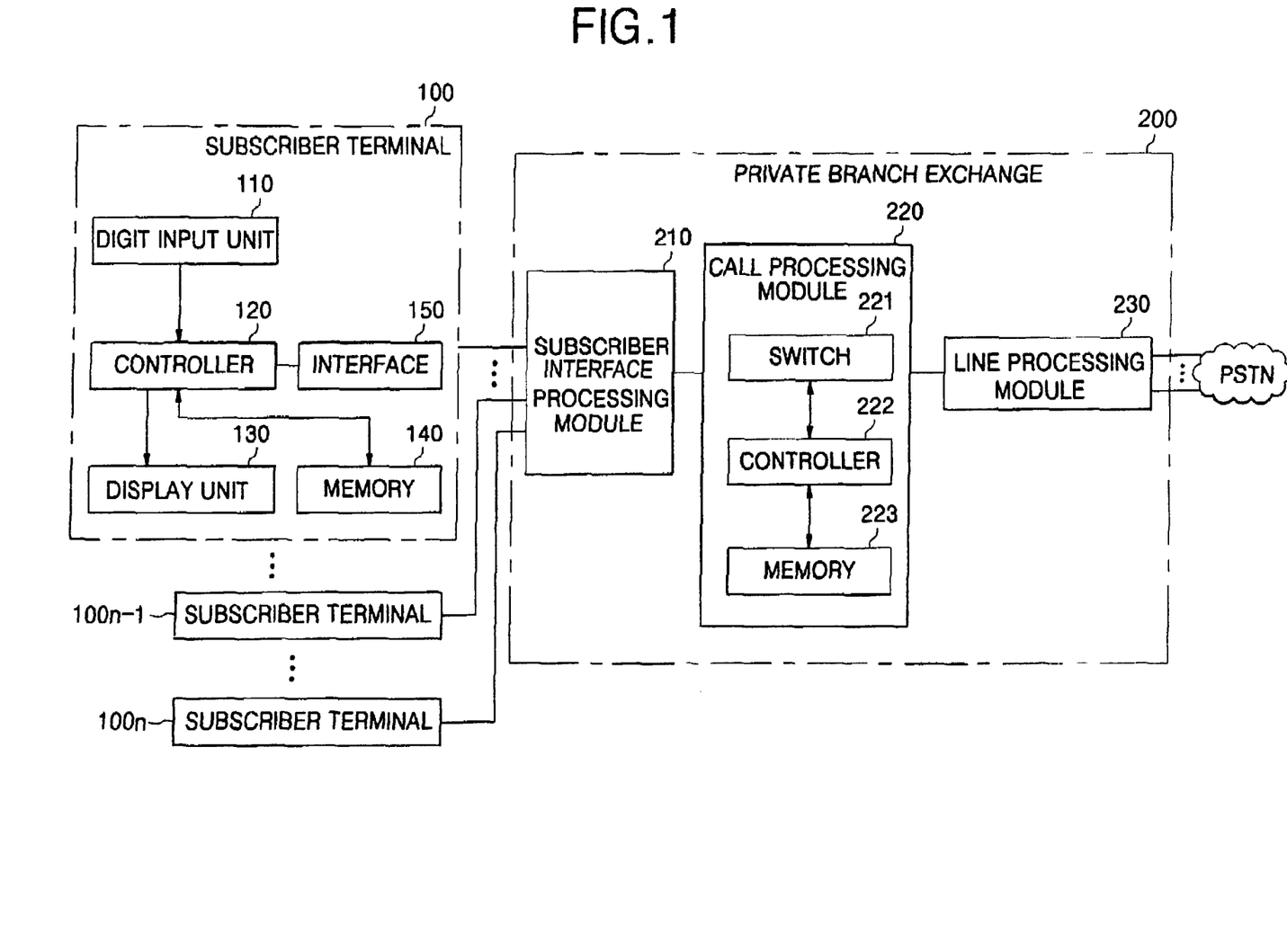
FIG. 1 is a block diagram of an emergency call processing apparatus and network links thereof in a private branch exchange system according to the invention.

FIG. 1 is a block diagram of an emergency call processing apparatus and network links thereof in a private branch exchange system according to the invention.

As shown in FIG. 1, the private switching system includes a plurality of subscriber terminals 100, . . . , 100n-1 and 100n, and a private branch exchange 200.

Each of the subscriber terminals 100, . . . , 100n-1 and 100n includes a digit input unit 110, a controller 120, a display unit 130, a memory 140 and an interface 150.

The private branch exchange 200 includes a subscriber interface processing module 210, a call processing module 220 and a line-processing module 230. The call processing module 220 includes a switch 221, a controller 222 and a memory 223.

With respect to the aforementioned operation, it will be described only in terms of emergency call processing functions of the invention, but not in terms of those functions, such as general signal processing, unrelated to the emergency call processing functions, in order to clarify the scope of protection of the invention.

When the subscriber terminal 100 is in a locking mode (also called "outgoing call screening mode"), the digit input unit 110 of the subscriber terminal 100 inputs digits into the controller 120. The digits include password digits for disabling the locking mode and telephone number digits of a receiving terminal, such as an emergency telephone number in use for call origination.

The display unit 130 displays digit values introduced from the digit input unit 110 under the control of the controller 120. In the locking mode of the subscriber terminal 100, when displaying the digit values introduced through the digit input unit 110, the display unit 130 acts to mask the digit values in order to prevent password leakage.

The memory 140 stores emergency telephone number information stored in the memory 223 of the call processing module 220 of the private switching system 200 and digit values of synchronized emergency telephone numbers, and also stores digit values of a password for disabling a locking mode in different memory areas. In an area of the memory 140, information on setting and disabling the locking mode of the subscriber terminal 10 is stored. The locking mode setting or disabling can be set by "1" or "0" like a flag.

The controller 120, upon receipt of digits via the digit input unit 120, confirms a locking mode setting flag stored in the memory 140 to determine whether the subscriber terminal 100 is currently set to the locking mode.

If it is determined that the subscriber terminal 100 is not set to the locking mode, the controller 120 displays inputted digit values sequentially on the display unit 130, and at the same time, transmits the digit values to the private branch exchange 200 via the interface 150 if all of the digit values are inputted.

However, if the subscriber terminal 100 is currently set to the locking mode, the controller 120 compares the inputted digit values to digit values corresponding to at least one emergency telephone number stored in the memory 140. If the inputted digit values are equivalent to or match the digit values corresponding to the emergency telephone number, the controller 120 displays the inputted digit values via the display unit 130 without masking them.

If any of the inputted digit values are not equivalent to or do not match the digit values corresponding to the emergency telephone number, the controller 120 determines the input digits as those corresponding to a password, and masks the remaining digit values including those which have been displayed already without masking, so that all of the digit values are displayed via the display unit 130.

Then, the controller 120 sequentially compares the inputted digit values to the digit values corresponding to the password stored in the memory 140. If the inputted digit values match the digit values corresponding to the password, the controller 120 controls the locking mode setting flag in the memory 140 into a locking mode disabling flag so as to disable the locking mode, and then transmits subsequent inputted digit values to the private branch exchange via the interface 150.

However, if the inputted digit values do not match the digit values corresponding to the password stored in the memory 140, that is, input numbers are not identical to the password, the controller 120 instructs the display unit 130 to display a message requesting re-input of a password due to unmatched password input.

In the meantime, if all of the inputted digit values match digit values corresponding to one of emergency telephone numbers stored in the memory 140, the controller 120 determines an emergency call origination, and then disables the locking mode set in the memory 140 and transmits the digit values of the emergency telephone number inputted via the digit input unit 110 to the private branch exchange 200 via the interface 150.

After an emergency telephone call is originated in the locking mode and then call communication is terminated, when a call termination signal with respect to the emergency outgoing call is received from the private branch exchange 200, the controller 120 converts the locking mode disabling flag into a locking mode setting flag so as to lock the subscriber terminal again. As a result, this relieves the user of the inconvenience of resetting the locking mode.

The subscriber interface processing module 210 of the private branch exchange 200 is interfaced with the subscriber terminals 100, . . . , 100n-1 and 100n so as to interface-process signals transmitted between the private branch exchange 200 and the subscriber terminals.

The switch 221 of the call processing module 220 switches an outgoing call to the line-processing module 230, which corresponds to the call telephone number of the subscriber terminal 100 received via the interface-processing module 210.

The memory 223 of the call processing module 220 stores emergency telephone number information stored in the memory 140 of the subscriber terminals 100, . . . , 100n-1 and 100n, synchronized therewith.

When the subscriber terminal 100 is not in the locking mode, the controller 222 of the call processing module 220 sequentially compares the digit values corresponding to the emergency telephone number transmitted from the subscriber terminal 100 to the digit values corresponding to at least one emergency telephone number stored in the memory 223.

If the digit values corresponding to the telephone number received from the subscriber terminal 100 match the digit values corresponding to one of the emergency telephone numbers stored in the memory 223, the controller 222 checks the line processing module 230 to find any available line in existence at the time.

If an available line exists, the controller 222 allocates the available line to provide a switching control signal to the switch 221 so that an outgoing call for the emergency telephone number corresponding to the input digits transmitted from the subscriber terminal 100 is transmitted via the line processing module 230 to the Public Switched Telephone Network (PSTN).

However, if an available line does not exist, the controller 222 intercepts one of busy lines according to preset conditions, and controls the switch 221 to switch the intercepted line as a line for transmitting the outgoing call for the emergency telephone number received from the subscriber terminal 100. Then, the originating signal for the emergency telephone number is transmitted via the line-processing module 230 to the PSTN. In this regard, the reference for intercepting one of the busy lines may be selectively set. For example, a line having the longest handling time may be intercepted based on counted handling times, or a line may be set for an emergency outgoing call so that, when the subscriber requests the emergency outgoing call with no available lines, the set line can be intercepted.

In the meantime, if the inputted digit values received from the subscriber terminal 100 do not match any of the emergency telephone numbers stored in the memory 223, that is, the telephone number selected by the subscriber terminal 100 is not any of the emergency telephone numbers, the controller 222 transmits an outgoing call signal via the line processing module 230 or sends a busy tone signal to the subscriber terminal 100 based on the existence of available lines.

When the locking mode of the subscriber terminal 100 is disabled by the input of the emergency telephone number, if the digit values of the emergency telephone number are received from the subscriber terminal 100, the controller 222 provides the inputted digit values to the line processing module 230 via the switch according to the existence of an available line so that the line processing module 230 processes an emergency outgoing call received from the subscriber terminal 100 via the PSTN. Upon completion of the emergency outgoing call communication according to emergency outgoing call processing, the controller 222 transmits an emergency outgoing call completion signal to the subscriber terminal 100 so that the subscriber terminal 100 can be set to the locking mode again.

As for the functions and operations of the aforementioned components, call receipt via the PSTN will not be described.

A more detailed description of the operation of the emergency call processing apparatus in the private switching system of the invention having the previously described structure will now be presented.

First, the memory 140 of the subscriber terminal 100 and the memory of the call processing module 220 of the private branch exchange 200 are designed to store at least one registered emergency telephone number, synchronized with each other, in order to enable emergency call processing of the invention. In this regard, operations for registering the emergency telephone number, and then synchronizing the emergency telephone number between the subscriber terminal 100 and the private branch exchange 200, will be described briefly.

When a user inputs an emergency telephone number through a user interface (UI) of the subscriber terminal 100 in order to initially register or update it, the controller 120 sequentially stores information on the inputted emergency telephone number in the memory 140, and then transmits the stored emergency telephone number information to the private branch exchange 200 via the interface 150.

The controller 222 of the private branch exchange 200 sequentially stores the received emergency telephone number information in the memory 223, and then broadcasts the emergency telephone number information to the extension terminals or subscriber terminals 100n-1 and 100n via the subscriber interface processing module 210 so that the emergency telephone number information is synchronized with the subscriber terminals 100n-1 and 100n.

While the above description has been made only with regard to a registration operation by the subscriber terminals 100, . . . , 100n-1 and 100n, even if the emergency telephone number information is initially registered or updated by the private branch exchange 200, it can be transmitted to the extension or subscriber terminals 100, . . . , 100n-1 and 100n and thus synchronized therebetween. In this case, the emergency telephone number information synchronized between the memory 140 of the subscriber terminal 100 and the memory 220 of the call processing module 220 of the private branch exchange 200 may be stored with a memory format as shown in Table I below.

TABLE 1

| No | Digit | Length |
|---|---|---|
| 1 | 119 | 3 |
| 2 | 112 | 3 |
| 3 | 2794301 | 7 |
| . . . | . . . | . . . |
| N | None | 0 |

As in Table I above, it should be understood that the user can selectively set the maximum number allocatable for emergency telephone number and their digits.

In this situation wherein the emergency telephone number information is synchronized between the extension or subscriber terminals 100, . . . , 100n-1 and 100n and the private branch exchange 200, when digit values corresponding to an outgoing telephone number are inputted via the digit input unit 110 of the subscriber terminal 100, the controller 120 of the subscriber terminal 100 inspects a locking mode setting flag to determine whether a locking mode is set.

If the locking mode is not set, the controller 120 transmits the digit values corresponding to the outgoing telephone number inputted from the digit input unit 110 to the private branch exchange 200 via the interface 150.

The subscriber interface-processing module 210 of the private branch exchange 200 provides the digit values transmitted from the subscriber terminal 100 to the controller 222 of the call processing module 220.

The controller 200 of the call processing module 200 sequentially compares the digit values inputted from the subscriber interface processing module 210 to those corresponding to any of emergency telephone numbers stored in the memory 223 in order to determine whether the digit values from the subscriber interface processing module 210 correspond to any of the emergency telephone numbers.

If the digit values of the emergency telephone number transmitted from the subscriber terminal 100 match one of the emergency telephone numbers stored in the memory 223, the controller 222 determines the telephone number received from the subscriber terminal 100 to be the emergency telephone number, and then checks lines of the line processing module 230 via the switch 221 to find any available lines for processing a present outgoing emergency call.

If an available line is found, the controller 222 controls the switch 221 to provide the received outgoing call to the line-processing module 230 via the available line. The line-processing module 230 generates a DTMF signal corresponding to digit values for the switched emergency outgoing call, and transmits it to the PSTN via the allocated (available) line.

However, if an available line does not exist at the time, the controller 222 provides a control signal to forcibly intercept one of the busy lines so that the line processing module 230 intercepts one line under the control of the controller 222. Then, the controller 222 allocates the forcibly intercepted line for emergency call processing, and controls the switch 221 to switch the digit values for the emergency call to the line-processing module 230. In this regard, the reference for intercepting one of the busy lines may be selectively set. For example, a line having the longest handling time may be intercepted based on counted handling times, or a line may be set for an emergency outgoing call so that, when the subscriber requests the emergency outgoing call with no available lines, the set line can be intercepted.

If the digit values corresponding to the called telephone number transmitted from the subscriber terminal 100 do not match those corresponding to one of the emergency telephone numbers stored in the memory 223, that is, if the telephone number from the subscriber terminal 100 is not one of the emergency telephone numbers, the controller 222 of the call processing module 220 of the private branch exchange 200 checks the switch 221 and the line processing module 230 to find an available line.

If an available line exists, the controller 222 controls the switch 221 to provide a received outgoing call (i.e., the digit values for the called telephone number) to the line processing module 230. The line processing module 230 generates a Dual Tone Multi-Frequency (DTMF) signal corresponding to the switched digit values for the outgoing call emergency, and transmits the DTMF signal to the PSTN via the allocated (available) line.

However, if an available line does not exist, the controller 222 transmits a busy tone signal to the subscriber terminal 100 via the subscriber interface-processing module 210.

When digit values are inputted through the digit input unit 110 of the subscriber terminal 100, if the subscriber terminal 100 is set to the locking mode, the controller 120 of the subscriber terminal 100 compares the inputted digit values to digit values corresponding to the emergency telephone number information stored in the memory 140 in order to determine whether the inputted digit values correspond to one of the emergency telephone numbers.

If the inputted digit values match digit values corresponding to one of the emergency telephone numbers, the controller 120 sequentially displays the inputted digit values on the display unit 130 of the subscriber terminal 100.

If all of the inputted digit values do not match the digit values corresponding to the emergency telephone numbers stored in the memory 140, that is, only some of the inputted digit values match some of the digit values corresponding to the emergency telephone numbers, all of the inputted digit values, including those displayed up to the present, are masked and then displayed on the display unit 130. However, if a first one of the inputted digit values does not match any of first digit values of the emergency telephone numbers, the inputted digit values from the beginning are masked and displayed on the display unit 130.

In this regard, the "masking" is conducted to prevent password leakage, based on the judgment that the inputted digit values are those corresponding to a password for disabling the locking mode rather than those corresponding to any of the emergency telephone numbers.

If all of the inputted digit values from the digit input unit 110 match the digit values corresponding to one of the emergency telephone numbers stored in the memory 140, the controller 120 converts a locking mode setting flag in the memory 140 into a locking mode disabling flag, thereby disabling the locking mode, and then transmits the inputted digit values received from the digit input unit 110 to the private branch exchange 200 via the interface 150.

However, if all of the inputted digit values do not correspond to any of the emergency telephone numbers and thus inputted in a masked and displayed state, the controller 120 compares the inputted digit values to the digit values corresponding to password(s) stored in the memory 140.

If the comparison shows that the inputted digit values do not match those corresponding to a password, the controller 120 displays a message on the display unit 130, requesting re-input of password.

However, if all the inputted digit values do match those corresponding to a password, the controller 120 disables the locking mode set in the memory 140, and transmits digit values corresponding to a called telephone number, when inputted since then via the digit input unit 100, to the private branch exchange 200.

Accordingly, the controller 222 of the call processing module 220 of the private branch exchange 200 determines whether an available line exists in order to process an outgoing call for the called telephone number transmitted from the subscriber terminal 100. If there is no available line, the controller 222 transmits a busy tone signal through the subscriber interface-processing module 210 to the subscriber terminal 100 which has sent the outgoing call. If there is an available line, the controller 222 transmits the outgoing call to the PSTN through the available line connected to the line-processing module 230.

Figure 2A:
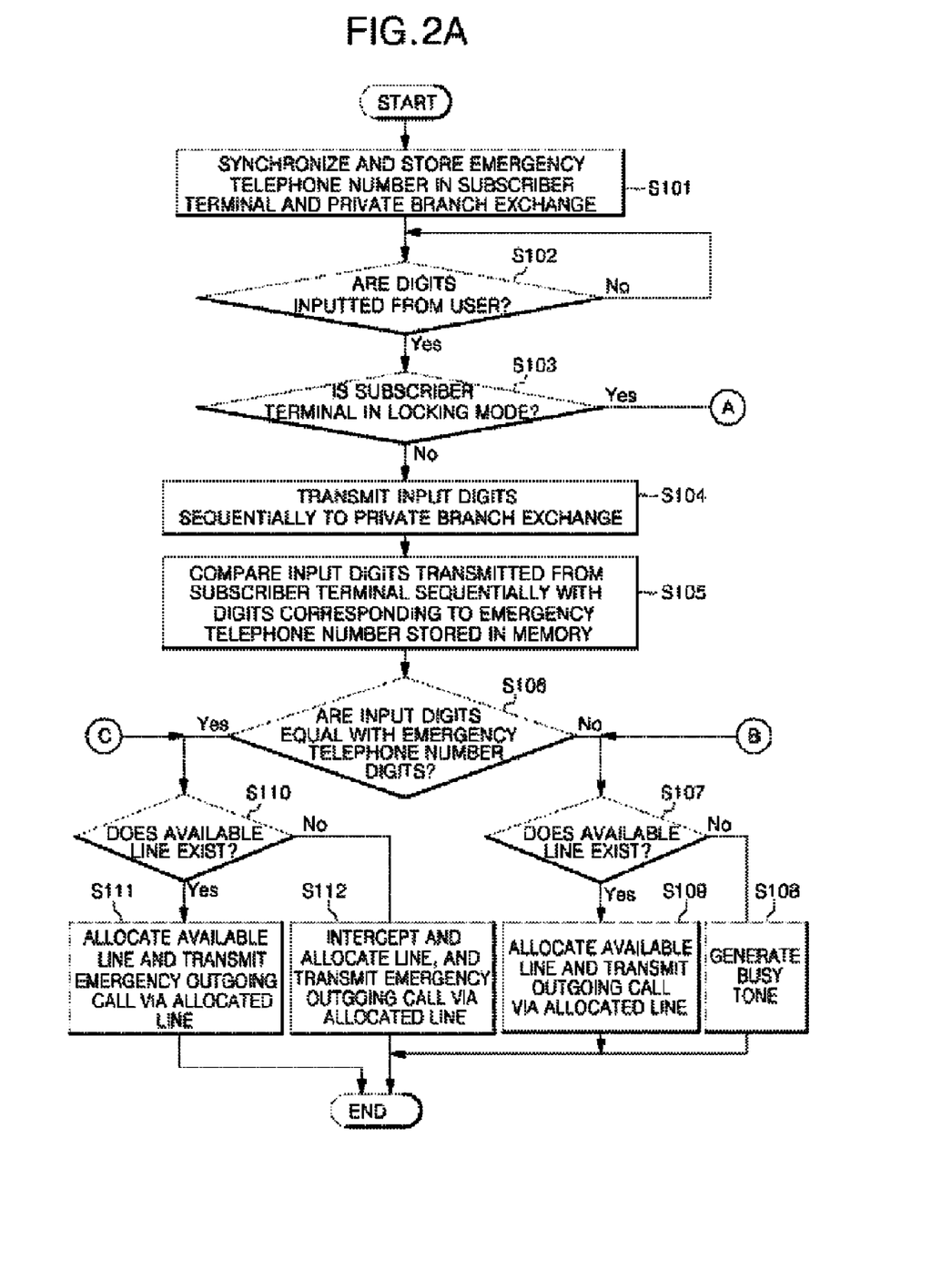
FIGS. 2A and 2B are flowcharts illustrating an emergency call processing method in a private branch exchange system according to the invention.
Figure 2B:
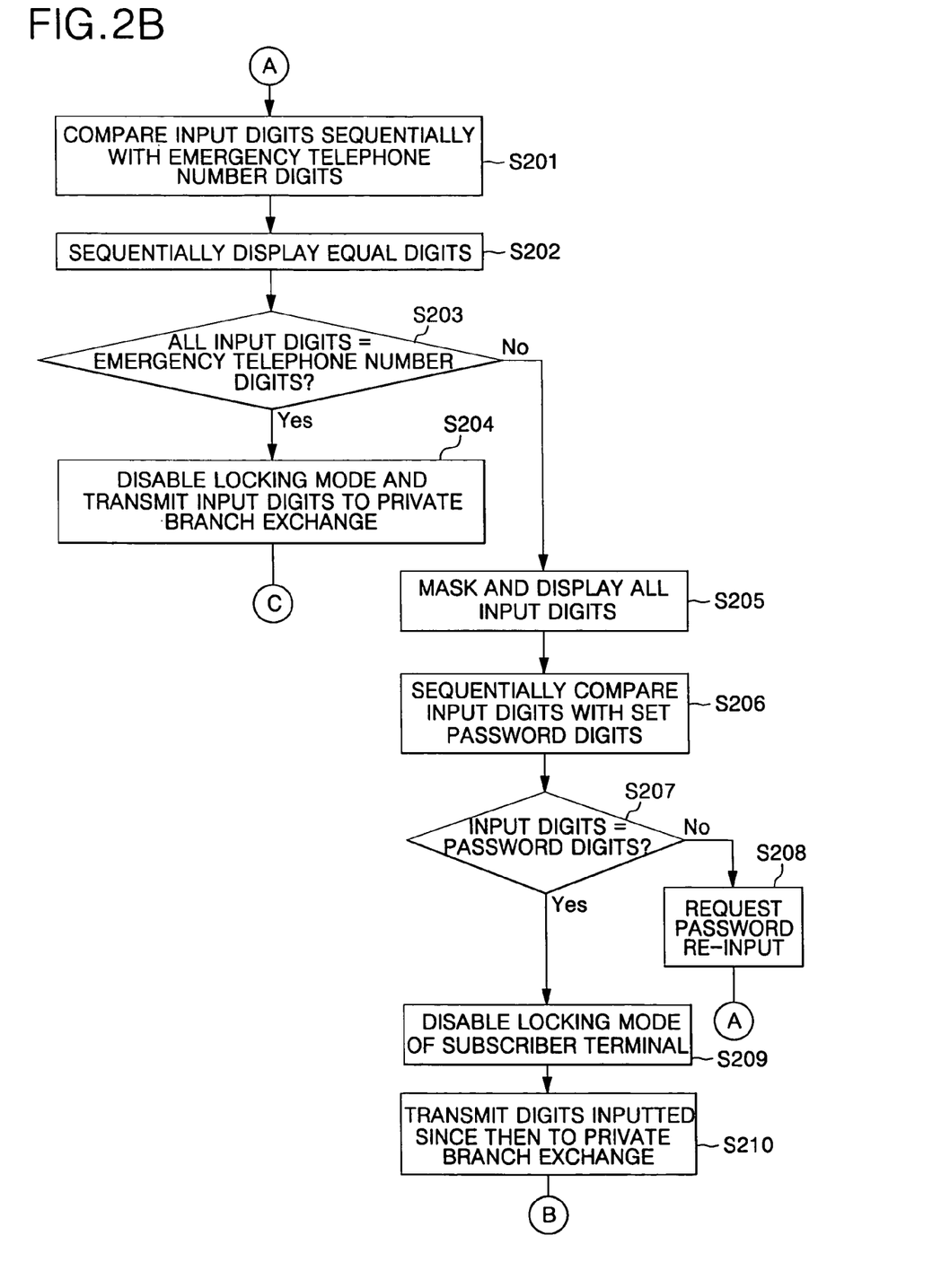

FIGS. 2A and 2B are flowcharts illustrating an emergency calling method in a private branch exchange system according to the invention.

Reference will be made to FIGS. 2A and 2B in order to sequentially describe an emergency call processing method of the invention corresponding to the operation of the above-described emergency call processing apparatus in a private switching system of the invention.

As shown in FIG. 2A, emergency telephone number information is synchronized among the plurality of subscriber terminals 100, . . . , 100n-1 and 100n and the private branch exchange 200, and are stored in each memory thereof in S101.

The synchronization of emergency telephone number information will not be described in detail as it has been described previously.

With the emergency telephone number information having being synchronized and stored in the subscriber terminals 100, . . . , 100*n*–1 and 100*n* and the private branch exchange 200, the subscriber terminal 100 determines whether digits are inputted from the user in S102.

If the digits are inputted, the subscriber terminal 100 determines whether it is in a locking mode in S103.

If it is determined that the subscriber terminal 100 is not set in the locking mode, the subscriber terminal 100 transmits inputted digit values sequentially to the private branch exchange 200 in S104.

Then, in S105, the private branch exchange 200 compares the digit values transmitted from the subscriber terminal 100 sequentially to respective digit values corresponding to one or more emergency telephone numbers stored in the memory 223 thereof.

If the inputted digit values do not match those corresponding to one of the emergency telephone numbers, that is, if the telephone number inputted from the subscriber terminal 100 is not one of the telephone numbers registered as emergency telephone numbers, the private branch exchange 200 determines whether there is a currently available line in S107.

If there is a currently available line, the private branch exchange 200 transmits an outgoing call for the telephone number corresponding to the inputted digits to the PSTN via the available line in S109. On the other hand, if there is not a currently available line, the private branch exchange 200 transmits a busy tone signal to the subscriber terminal 100 which has sent the inputted digits in order to inform the user that the outgoing call cannot be processed in S108.

If the inputted digit values match those corresponding to one of the emergency telephone numbers in S106, the private branch exchange 200 determines whether a currently available line exists in S110.

If there is a line available, the private branch exchange 200 transmits an outgoing call for an emergency telephone number corresponding to the inputted digits to the PSTN via the available line in S111.

However, if there is not a line available and all lines are busy in S110, the private branch exchange 200 intercepts a call on a busy line and transmits an outgoing call corresponding to the emergency telephone number to the PSTN via the intercepted line in S112. The process for intercepting a busy line where no lines are available will not be described again since it has been described previously.

In the meantime, if the subscriber terminal 100 is currently set in the locking mode in S103, the subscriber terminal 100 compares the inputted digits sequentially to those corresponding to the emergency telephone numbers stored in the memory 140 in S201.

Those digits proved to be a match as a result of comparison are sequentially displayed on the display unit 130 in S202. In this regard, if the first digit value does not match, the digit values are determined to be those of a password for disabling the locking mode rather than those of one of the emergency telephone numbers, and the inputted digits are masked and displayed on the display unit 130.

All of the inputted digit values compared in S201 above are judged as to whether or not they match those corresponding to the emergency telephone numbers stored in the memory 140 in S203. That is, it is determined whether the telephone number inputted by the user matches one of the emergency telephone numbers stored in the memory 140.

If the inputted digit values match those corresponding to one of the telephone numbers stored in the memory 140, the subscriber terminal 100 disables the locking mode, and then transmits the inputted digits to the private branch exchange 200 for the purpose of emergency call origination in S204.

After the inputted digit values for emergency call origination are transmitted to the private branch exchange 200 as above, process steps of S110, S111 and S112 in FIG. 2A are carried out so as to process an emergency outgoing call. When the subscriber terminal 100 is in the locking mode, if emergency call communication is terminated through emergency telephone number input, the private branch exchange 200 transmits an emergency call termination signal to the subscriber terminal 100 so that the subscriber terminal 100 can be converted to the locking mode again.

However, in S203 of FIG. 2B, if all of the inputted values do not match those corresponding to the emergency telephone numbers stored in the memory 140 in S203 of FIG. 2B, the subscriber terminal 100 determines the inputted digit values to be those for a password for disabling the locking mode rather than for any of the emergency telephone numbers, and masks and displays all of the inputted digits on the display unit 130 in S205. In this regard, the masked inputted digit values include those displayed on the display unit 130 due to matching of the initial digit.

Then, the inputted digit values are compared to those stored in the memory 140, which correspond to a password for disabling the locking mode in S206, and their equality is determined in S207.

If the inputted digit values are determined to not match those stored in the memory 140 and corresponding to a password, the subscriber terminal 100 displays a message on the display unit 130, requesting the user to re-input the password, in S208.

On the other hand, if the inputted digit values are determined to match those stored in the memory 140 and corresponding to a password in S207, the subscriber terminal 100 disables the locking mode in S209, and sequentially transmits digits, which are inputted by the user since then, to the private branch exchange 200 in S210.

After digits for the inputted telephone number (that is, a general telephone number rather than an emergency telephone number) are transmitted to the private branch exchange 200, the private branch exchange 200 carries out steps S207, S208 and S209 so as to process an outgoing call for the inputted telephone number.

The emergency call processing apparatus and method in a private switching system according to certain embodiments of the invention have been described above. Nations have some emergency telephone numbers, such as 119 and 911, set for emergency. In general, a private branch exchange has more extension subscribers than office lines, and thus the extension subscribers share the office lines. If an emergency outgoing call is attempted when all of the office lines are busy, priority is given to the emergency outgoing call, and one of the busy lines is forcibly intercepted so that the emergency outgoing call can be processed. As an advantageous result, an emergency can be rapidly coped with.

In particular, when an extension terminal is set in a locking mode, an emergency call can be processed without inconveniently disabling the locking mode through the input of a password, and thus an emergency can be easily coped with. Then, the emergency outgoing call can be easily processed, even if all of the lines are busy or the subscriber terminal is set in the locking mode.

While the present invention has been shown and described in connection with the preferred embodiments, it will be apparent to those skilled in the art that modifications and variations can be made without departing from the spirit and scope of the invention as defined by the appended claims.

What is claimed is:

1. An emergency call processing method in a private switching system, comprising:
   in response to receiving a telephone number in a locking mode, determining whether the received telephone number matches at least one emergency telephone number;
   in response to the received telephone number not matching the at least one emergency telephone number, displaying digit values of the received telephone number by masking; and
   in response to the received telephone number matching one of the at least one emergency telephone number, disabling the locking mode and transmitting an outgoing call corresponding to the received telephone number to a private branch exchange.

2. The emergency call processing method according to claim 1, wherein the determining comprises:
   comparing the digit values of the received telephone number sequentially with digit values of a password; and
   in response to the digit values of the received telephone number matching the digit values of the password, disabling the locking mode and transmitting the digit values of the received telephone number to the private branch exchange.

3. The emergency call processing method according to claim 2, wherein the displaying comprises:
   in response to the received telephone number matching one of the at least one emergency telephone number, displaying the digit values of the received telephone number without masking.

4. An emergency call processing method in a private switching system, comprising:
   storing at least one emergency telephone number and a numerical length of each of the at least one emergency telephone number;
   in response to digit values of a telephone number received from a subscriber terminal matching digit values of one of the at least one emergency telephone number, determining whether a line is available for call transmission; and
   in response to a line not being available, intercepting at least one occupied line according to a priority, allocating the intercepted at least one occupied line for emergency call transmission, and transmitting an emergency outgoing call via the allocated line.

5. The emergency call processing method according to claim 4, wherein the priority comprises at least one of a priority according to line-occupied time and a priority according to a line number set for the emergency call transmission, and
   wherein the numerical length of each of the at least one emergency telephone number is synchronized between the subscriber terminal and a private branch exchange.

6. An emergency call processing method in a private switching system, comprising:
   at a subscriber terminal in a locking mode, in response to receiving a telephone number, determining whether the received telephone number matches at least one emergency telephone number;
   in response to the received telephone number matching one of the at least one emergency telephone number, at the subscriber terminal, disabling the locking mode and transmitting digit values of the received telephone number to a private branch exchange;
   in response to the received telephone number not matching the least one emergency telephone number, displaying digit values of the received telephone number by masking at the subscriber terminal;
   at the private branch exchange, in response to receiving the digit values from the subscriber terminal, determining whether a line is available for emergency call transmission corresponding to the received digit values; and
   in response to a line not being available for the emergency call transmission, at the private branch exchange, intercepting at least one occupied line according to a priority, allocating the intercepted at least one line for emergency call transmission, and transmitting an emergency outgoing call via the allocated line.

7. The emergency call processing method according to claim 6, wherein the determining comprises:
   comparing the digit values of the received telephone number sequentially to digit values of a password; and
   in response to the received telephone number matching the digit values of the password, disabling the locking mode and transmitting the digit values of the received telephone number to the private branch exchange.

8. The emergency call processing method according to claim 7, wherein the displaying comprises:
   in response to the received telephone number matching one of the at least one emergency telephone number, displaying the digit values of the received telephone number without masking.

9. The emergency call processing method according to claim 6, wherein the priority comprises at least one of a priority according to line-occupied time and a priority according to a line number set for the emergency call transmission.

10. The emergency call processing method according to claim 6, further comprising:
    synchronizing the at least one emergency telephone number between the subscriber terminal and the private branch exchange when performing one of initially registering, additionally registering, initially deleting, and additionally deleting the at least one emergency telephone number.

11. The emergency call processing method according to claim 10, wherein the synchronizing comprises:
    at the subscriber terminal, in response to receiving a request for one of emergency telephone number registration and emergency telephone number deletion via a user interface of the subscriber terminal, updating a database of the subscriber terminal according to information corresponding to a requested emergency telephone number, and transmitting emergency telephone number update information corresponding to the requested emergency telephone number to the private branch exchange; and
    at the private branch exchange, updating an emergency telephone number database of the private branch exchange according to the emergency telephone number update information received from the subscriber terminal, and transmitting the updated information to a second terminal to synchronize the emergency telephone number update information with the second terminal.

12. The emergency call processing method according to claim 10, wherein the synchronizing comprises:
    at the private branch exchange, in response to receiving a request for one of emergency telephone number registration and emergency telephone number deletion, updating a database of the private branch exchange according to information corresponding to a requested emergency telephone number, and transmitting emergency telephone number update information corresponding to the requested emergency telephone number to the subscriber terminal to synchronize with the subscriber terminal.

13. An emergency call processing method in a private switching system, comprising:
   at a private branch exchange, storing at least one emergency telephone number and a numerical length of each of the at least one emergency telephone number;
   at a subscriber terminal, in response to receiving a telephone number, determining whether a locking mode is set;
   at the subscriber terminal, in response to the locking mode not being set, transmitting digit values of the received telephone number to the private branch exchange;
   at the private branch exchange, in response to receiving the digit values of the received telephone number from the subscriber terminal, comparing the received digit values of the received telephone number to digit values corresponding to the at least one stored emergency telephone number;
   at the private branch exchange, in response to the received digit values of the received telephone number matching the digit values corresponding to one of the at least one stored emergency telephone number, determining whether a line is available for emergency call transmission; and
   at the private branch exchange, in response to a line not being available for the emergency call transmission, intercepting at least one occupied line according to a priority, allocating the intercepted at least one occupied line for emergency call transmission, and transmitting an emergency outgoing call via the allocated line.

14. The emergency call processing method according to claim 13, wherein the priority comprises at least one of a priority according to line-occupied time and a priority according to a line number set for the emergency call transmission, and
   wherein the numerical length of each of the at least one emergency telephone number is synchronized between the subscriber terminal and the private branch exchange.

15. The emergency call processing method according to claim 13, further comprising:
   synchronizing an emergency telephone number between the subscriber terminal and the private branch exchange when performing one of initially registering, additionally registering, initially deleting, and additionally deleting each of the at least one emergency telephone number.

16. The emergency call processing method according to claim 15, wherein the synchronizing comprises:
   at the subscriber terminal, in response to receiving a request for one of emergency telephone number registration and emergency telephone number deletion via a user interface of the subscriber terminal, updating a database of the subscriber terminal according to information corresponding to a requested emergency telephone number, and transmitting emergency telephone number update information corresponding to the requested emergency telephone number to the private branch exchange; and
   at the private branch exchange, updating an emergency telephone number database of the private branch exchange according to the emergency telephone number update information transmitted from the subscriber terminal, and transmitting the updated information to a second terminal to synchronize the emergency telephone number update information with the second terminal.

17. The emergency call processing method according to claim 15, wherein the synchronizing comprises:
   at the private branch exchange, in response to receiving a request for one of emergency telephone number registration and emergency telephone number deletion, updating a database of the private branch exchange according to information corresponding to a requested emergency telephone number, and transmitting emergency telephone number update information corresponding to the requested emergency telephone number to the subscriber terminal to synchronize with the subscriber terminal.

18. An emergency call processing apparatus in a private switching system, comprising:
   a call processing unit to receive, in a locking mode, a telephone number, to disable the locking mode in response to the received telephone number matching at least one emergency telephone number, and to transmit an outgoing call corresponding to the received telephone number to a private exchange branch,
   wherein the call processing unit comprises a controller to mask digit values of the received telephone number in response to the received telephone number not matching the least one emergency telephone number.

19. The emergency call processing apparatus according to claim 18, wherein the call processing unit further comprises:
   a memory to store, in a digital format, the at least one emergency telephone number and a password for disabling the locking mode; and
   a display unit to display digit values of the received telephone number, and
   wherein the controller compares the digit values of the received telephone number sequentially with digit values of the password, and in response to the digit values of the received telephone number matching the digit values of the password, disables the locking mode and transmits the digit values of the received telephone number to the private branch exchange.

20. The emergency call processing apparatus according to claim 19, wherein, in response to the received telephone number matching the at least one emergency telephone number, the controller controls the display unit to display the digit values of the received telephone number without masking.

21. An emergency call processing apparatus in a private switching system, comprising:
   a call processing module to control a memory to store at least one emergency telephone number and a numerical length of each of the at least one emergency telephone number, to determine whether a line is available in response to digit values of a telephone number received from a subscriber terminal matching digit values of one of the at least one emergency telephone number, to intercept at least one occupied line according to a priority in response to no line being available, to allocate the intercepted at least one occupied line for emergency call transmission, and to transmit an emergency outgoing call via the allocated line.

22. The emergency call processing apparatus according to claim 21, wherein the call processing module comprises the memory, the memory storing the priority to intercept the at least one occupied line.

23. The emergency call processing apparatus according to claim 22, wherein the information relative to the priority comprises at least one of priority information according to line-occupied time and priority information according to a line number set for the emergency call transmission, and
  wherein the numerical length of each of the at least one emergency telephone number is synchronized between the subscriber terminal and a private branch exchange.

24. A private switching system, comprising:
  a subscriber terminal to receive, in a locking mode, a telephone number, and to disable the locking mode and transmit digit values of the received telephone number in response to the received telephone number matching at least one emergency telephone number; and
  a private branch exchange which, in response to receiving the digit values of the received telephone number from the subscriber terminal, determines whether a line is available, and in response to no line being available, the private branch exchange intercepts at least one occupied line according to a priority, allocates the intercepted at least one occupied line for emergency call transmission, and transmits an emergency outgoing call via the allocated line,
  wherein the subscriber terminal comprises a controller to mask the digit values of the received telephone number in response to the received telephone number not matching the at least one emergency telephone number.

25. The private switching system according to claim 24, wherein the subscriber terminal further comprises:
  a memory to store, in a digital format, emergency telephone numbers and a password to disable the locking mode; and
  a display unit to display digit values corresponding to the received telephone number,
  wherein the controller disables the locking mode and transmits the digit values of the received telephone number sequentially to the private branch exchange in response to the received telephone number matching the password.

26. The private switching system according to claim 25, wherein, in response to the received telephone number matching at least one of the stored emergency telephone numbers, the controller controls the display unit to display the digit values of the received telephone number without masking.

27. The private switching system according to claim 25, wherein the priority comprises at least one of priority information according to line-occupied time and priority information according to a line number set for the emergency call transmission.

28. A private switching system, comprising:
  a subscriber terminal which, in response to receiving a telephone number when a locking mode is not set, transmits digit values of the received telephone number;
  a private branch exchange to control a memory to store at least one emergency telephone number and a numerical length of each of the at least one emergency telephone number, and to determine whether a line is available in response to receiving the digit values of the received telephone number from the subscriber terminal and in response to the received digit values matching digit values corresponding to one of the at least one stored emergency telephone number and in response to no line being available, the private branch exchange intercepts at least one occupied line according to a priority, allocates the intercepted at least one occupied line for emergency call transmission, and transmits an emergency outgoing call via the allocated line.

29. The private switching system according to claim 28, wherein the private branch exchange comprises the memory, the memory storing information relating to the priority.

30. The private switching system according to claim 29, wherein the information relating to the priority comprises at least one of priority information according to line-occupied time and priority information according to a line number set for the emergency call transmission, and
  wherein the numerical length of each of the at least one emergency telephone number is synchronized between the subscriber terminal and the private branch exchange.

* * * * *